United States Patent
Möbius et al.

(10) Patent No.: US 6,242,833 B1
(45) Date of Patent: Jun. 5, 2001

(54) WOUND COVER ARRANGEMENT FOR AN ELECTRIC MOTOR ROTOR

(75) Inventors: Marcos Romeu Möbius; Rivio Arturo Ramirez, both of Joinville-SC (BR)

(73) Assignee: Empresa Brasileira de Compressores S.A.-Embraco, Joinville-SC (BR)

( * ) Notice: Subject to any disclaimer, the term of this patent is extended or adjusted under 35 U.S.C. 154(b) by 0 days.

(21) Appl. No.: 09/485,440
(22) PCT Filed: Sep. 2, 1998
(86) PCT No.: PCT/BR98/00068
    § 371 Date: Feb. 9, 2000
    § 102(e) Date: Feb. 9, 2000
(87) PCT Pub. No.: WO00/14858
    PCT Pub. Date: Mar. 16, 2000
(51) Int. Cl.[7] ............... H02K 15/03; H02K 1/27
(52) U.S. Cl. ............... 310/156; 310/43; 310/45; 310/216; 310/261
(58) Field of Search .................... 310/156, 261, 310/45, 43, 216, 217, 262, 264, 265, 42

(56) References Cited

U.S. PATENT DOCUMENTS

| | | |
|---|---|---|
| 4,433,261 | 2/1984 | Nashiki et al. . |
| 4,633,113 | 12/1986 | Patel . |
| 4,954,736 * | 9/1990 | Kawamoto et al. ............ 310/156 |
| 5,704,111 * | 1/1998 | Johnson et al. ............ 310/156 |

\* cited by examiner

*Primary Examiner*—Burton Mullins
(74) *Attorney, Agent, or Firm*—Darby & Darby

(57) ABSTRACT

A wound cover arrangement for an electric motor rotor, said rotor including a core (20), magnets (30) surrounding said core and a cover (10), which is wound around the core, in order to retain said magnets (30) on said core, said arrangement comprising a pair of mold end elements (40), each mounted to an end face portion of the rotor core (20) and to the adjacent end face of at least one of the parts defined by the cover (10) and magnets (30), and which has a peripheral edge portion (41) provided with at least one recess (43) extending towards the rotor axis, the distance between said rotor and the bottom of said recess (43) defining the smallest winding end radius of the cover.

6 Claims, 1 Drawing Sheet

U.S. Patent      Jun. 5, 2001      US 6,242,833 B1
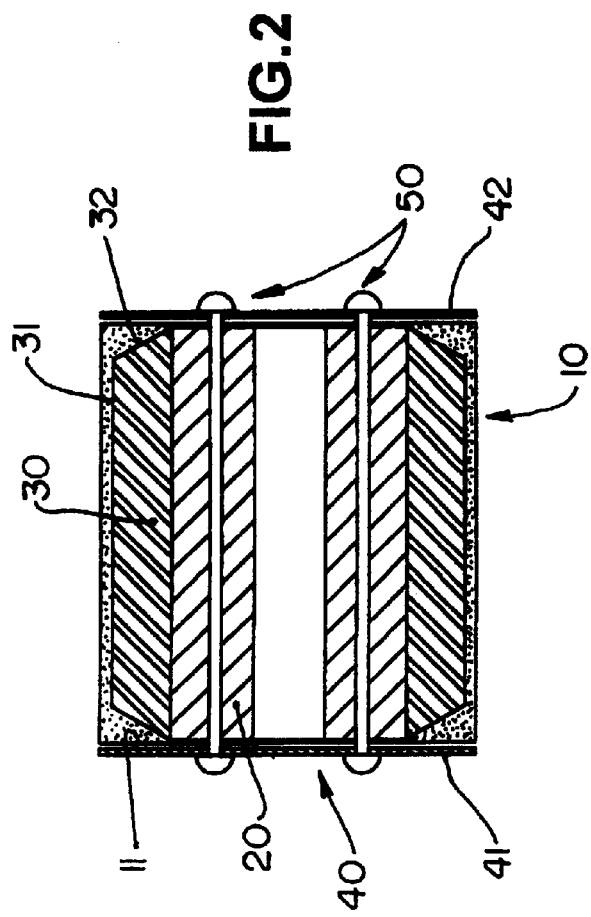
FIG.2
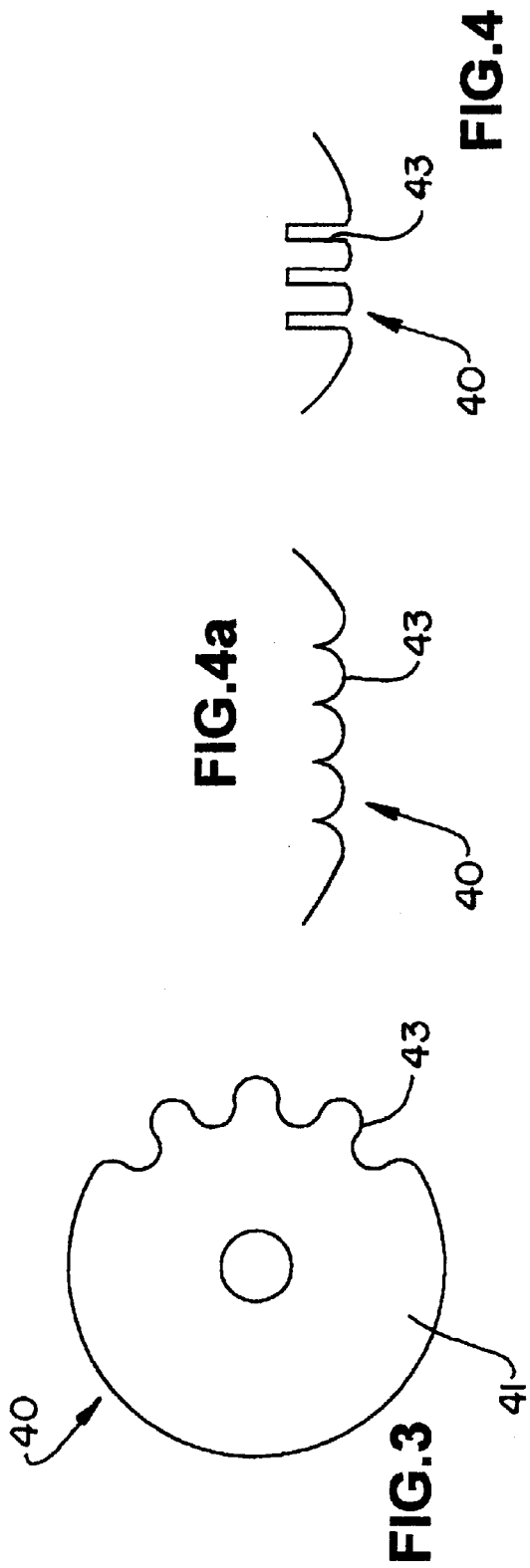
FIG.4
FIG.4a
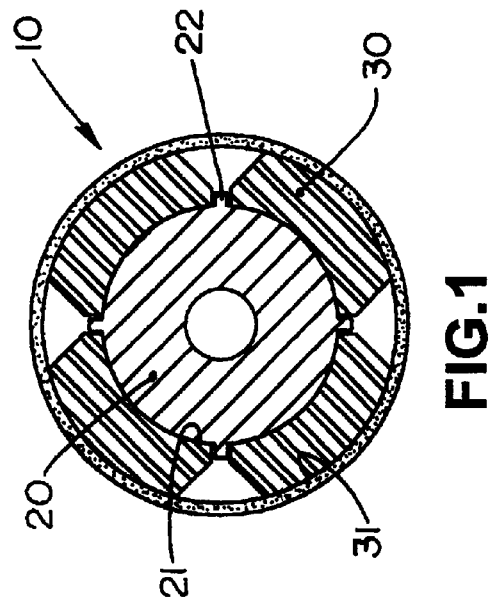
FIG.1
FIG.3

US 6,242,833 B1

WOUND COVER ARRANGEMENT FOR AN ELECTRIC MOTOR ROTOR

FIELD OF THE INVENTION

The present invention refers to a wound cover arrangement for an electric motor rotor of the type including permanent magnets.

BACKGROUND OF THE INVENTION

Rotors with permanent magnets are formed with a cylindrical core, usually in iron, which may be laminated or massive and around which is seated a plurality of magnets, usually in the form of arcuate plates, and a rotor cover provided externally to said magnets, in order to retain them close to said core, avoiding relative radial and circumferential displacements between said core and said magnets during the operation of the motor, when the magnets are submitted to centrifugal forces, which tend to separate them from the core, to a momentum, which causes the circumferential displacement of said magnets around the rotor core, and to stresses of thermal origin. Moreover, the constructive form which is used to retain the magnets to the rotor is very important to determine the electrical efficiency of the motor.

Besides having the function of maintaining the magnets close to the core, the cover also avoids the disaggregation and release of magnet fragments caused by the forces existing thereon, as mentioned above. Among the known solutions of a rotor cover for an electric motor discussed in copending Patent Application PI9601676, the wound cover which surrounds the magnets provided around the core and which is obtained by winding a bundle of fibers has, as a constructive advantage in relation to the other known covers, its capability of conforming to the dimensional variations of the magnets, resulting from the manufacturing process of said magnets.

According to the known techniques, the wound covers for an electric motor rotor are obtained by winding a strip or a bundle of fibrous material, which is usually impregnated with resin around the rotor core-magnet assembly and which is cured afterwards during a time and at a temperature which are sufficient to obtain the rigidity required for the rotor cover.

However, during a mass production winding process, which is usually carried out in a sequence of cores carrying respective magnets, the covers thus obtained have the inconvenience of not allowing an appropriate finishing of their end portions. This problem occurs during the passage of the winding element from one rotor to the other in the production line, after the winding of the previous rotor has been concluded. At this moment, the winding equipment causes a sudden movement of the pre-tensioned fiber which forms the cover, towards the next rotor, requiring in the known methods posterior scraping, sanding or machining of each end surface of the wound cover in the rotor, after said cover has been cut, allowing its finishing to take place. Without this finishing, the barbs resulting from the cutting operation cause assembly and durability problems and even impairment in the gap between the rotor and stator.

Besides the above cited problem, during the passage of the pre-tensioned fiber from one rotor to the other, plastic deformation of the mold end element placed adjacent to each of the ends of each rotor may occur, impairing the dimensional characteristics of said rotor and the functional characteristics of said mold end element. One way of eliminating this deformation is to increase the thickness of the mold end element, in order to obtain higher mechanical rigidity.

However, this solution increases the cost of both the material and the process, as well as the weight of the motor.

DISCLOSURE OF THE INVENTION

Thus, it is an objective of the present invention to provide a wound cover arrangement for an electric motor rotor of the type which is wound with a bundle of fibers and which allows obtaining rotors with a better finishing of their ends, besides minimizing the problem caused by the release of the strip ends in any of the production steps of said cover or during the operation of the rotor.

It is another objective of the present invention to provide a wound cover arrangement for an electric motor rotor such as mentioned above, which permits to produce rotors, without requiring additional steps after the mass production winding process for obtaining said rotors.

These and other objectives of the present invention are achieved by a wound cover arrangement for an electric motor rotor, including a core, magnets surrounding said core and a wound cover provided around the core, in order to retain the magnets on said core, said wound cover arrangement comprising a pair of mold end elements, each mounted to an end face portion of the rotor core and to the adjacent end face of at least one of the parts defined by the cover and magnets, and which has a peripheral edge portion provided with at least one recess extending towards the rotor axis, the distance between said rotor and the bottom of said recess defining the smallest winding end radius of the cover.

BRIEF DESCRIPTION OF THE DRAWINGS

The invention will be described below, with reference to the attached drawing, in which:

FIG. 1 shows, schematically and in a sectional view, an assembly consisting of a rotor core, magnets and rotor cover of an electric motor;

FIG. 2 shows, schematically and in a longitudinal sectional view, an embodiment of an electric motor rotor;

FIG. 3 shows, schematically, partially and in a plan view, the mold end element of the rotor obtained according to a constructive form of the present invention; and FIGS. 4 and 4a show, schematically and partially, an enlarged upper plan view of two different embodiments for the peripheral edge of a mold end element according to the present invention.

BEST MODE OF CARRYING OUT THE INVENTION

The present invention refers to a cover 10, for an electric motor rotor of the type having a core 20, which is to be affixed surrounding at least part of the rotor shaft and around which are seated magnets 30, usually in the form of arcuate magnetic plates affixed on an external cylindrical surface 21 of the rotor core 20 preferably according to two alignments of longitudinal projections for contacting said external cylindrical surface and which are circumferentially spaced from each other, said magnets 30 being retained against the core 20 by actuation of the cover 10. The spacing between the magnets 30 is obtained by spacing means, for example in the form of projections 22 defined from the external cylindrical surface 21 of the core 20.

According to the present invention, the cover 10 is obtained by a continuous helical winding of a bundle of fibers, for example made from a compound material such as kevlar, carbon or glass fibers, aggregated with a resin around an external cylindrical surface 31 of the magnets 30, in order to allow the hardening of the cover during the curing phase thereof.

It should be understood that the winding with a bundle of fibers may be achieved with a compound material (the fiber being pre-impregnated with resin at the plant or during the winding process) or by dry winding, with the posterior impregnation of the bundle of fibers with resin.

The present invention allows to obtain a cover 10 with a lateral wall formed with a minimum amount of layers of the bundle of compound material fibers surrounding the magnets 30, said lateral wall being preferably formed by a single layer of the bundle of compound material fibers, in order that the gap generated by said layer affects very little the efficiency of the motor.

To reduce the lateral thickness of the cover 10 of the present invention, without any risk of the ends thereof being released or fragilized, each of said ends of the bundle of compound material fibers is tied at a respective end peripheral portion 11 of the cover 10.

According to a cover described in copending Patent Application PI9601676, each end peripheral portion 11 of the cover 10 is obtained, while winding the bundle of fibers around the magnets 30, by seating this bundle of fibers on an annular supporting surface, which is radially spaced back in relation to the external cylindrical surface 31 of the magnets 30 and covering, for example, the whole radial extension from the outside to the inside of an adjacent end face 32 of the magnets 30.

The end peripheral portion 11 of the cover 10 may be designed to cover only partially the radial extension from the outside to the inside of the adjacent end face 32 of the magnets 30.

In this solution, each end peripheral portion 11 has a profile defined, on one side, by the profile of the adjacent end face 32 of the magnets 30 and, on the other side, by a mold end element 40 which, in a preferred construction, is defined by a finishing end cap.

Each mold end element 40 is mounted to an adjacent end face of the core 20 of the rotor, so as to also cover at least one of the parts defined by the adjacent end face of the magnets 30 and by the cover 10, said mold end element being maintained affixed to the rotor when incorporated thereto by, for example, retaining elements 50.

The mold end elements 40 may be incorporated to the rotor or also provided in a winding equipment, in order to guarantee the desired shape and dimensions of the wound cover to be achieved, maintaining them unaltered during the entire winding process and until the cover has completely cured (solidification).

According to the present invention, each mold end element 40 has a peripheral edge portion 41, for example coplanar to a central portion 42 of said mold end element 40 or also projecting from this central portion, gradually axially spaced from the plane of the adjacent end face of the rotor core 20, as disclosed in copending Patent Application PI9601676, said mold end element 40 being provided, from its peripheral edge portion 41, with at least one recess 43 extending towards the rotor axis, the distance between the rotor and the bottom of said recess 43 defining the smallest winding end radius of the cover 10, the largest winding radius being that which coincides with the distance between the rotor axis and the external lateral surface of the cover 10.

During the manufacture of each rotor, by individual or by mass production winding, the provision of one or more recesses 43 at the peripeheral edge portion 41 of each mold end element 40 determines, at the beginning of the cover winding operation, a guide to the first turn of the layer of the bundle of compound material fibers of the cover 10 and, at the end of said cover winding operation, a stop means to the layer of bundle of fibers which defines the cover 10.

In the condition in which the rotors are individually wound, one of the ends of the cover 10 to be wound surrounding the rotor should be affixed to the winding axis or to an adequate retaining means (which is provided at the rotor, for example in the mold end elements thereof, or also in the winding/curing device to be used), and being thus kept until the winding has ended, when the excess of material, if existing, will be eliminated.

The provision of one or more recesses 43 at the peripheral edge portion 41 of each mold end element 40 determines, during the mass production winding, the winding end of the cover of each assembly formed by the rotor core and magnets and the beginning of the winding of the next rotor cover of the sequence, with a finishing operation which does not require additional treating steps of the rotor end faces, as in the prior art.

According to one constructive option for carrying out the present invention, each mold end element 40 includes at least one plurality of recesses 43 occupying at least part of the circumferential extension of the peripheral edge portion 41 of said mold end element 40. When said recesses 43 occupy part of the circumferential extension of the peripheral edge portion 41 (FIG. 3), for the mass production winding it is required a previous alignment between the recesses 43 of two mold end elements 40 consecutively located in the winding device, in order to avoid loss of material between the winding of each two rotors sequentially placed in this device for receiving the cover 10.

According to the illustrated embodiments, each recess 43 has a substantially "U" shaped rounded profile and defines, for example (FIG. 3), a sinusoidal profile with the peripheral edge portion 41. In another embodiment, illustrated in FIG. 4, the peripheral edge portion 41 has a plurality of recesses 43, which are angularly and equally spaced from each other.

In the embodiment of FIG. 4a, the recesses 43 are in the form of slots of small thickness defined as a function of the thickness of the material which forms the cover 10.

Though not illustrated, the peripheral edge portion 41 of each mold end element 40 may be provided, partially or throughout its circumferential extension, with at least one plurality of recesses with the same profile or with different profiles.

What is claimed is:

1. A wound cover arrangement for an electric motor rotor comprising:

a rotor including a core having a center axis and magnets surrounding said core;

a cover wound around the rotor to retain said magnets on said core;

a mold end element each mounted to each end face portion of the rotor core and to the adjacent end face of at least one of the parts defined by the cover and magnets, each end element having a peripheral edge portion provided with at least one recess extending towards the rotor center axis, the distance between said rotor center axis and the bottom of said recess defining the smallest winding radius of the cover from the rotor center axis.

2. A wound cover arrangement, as in claim 1, wherein said at least one recess of a mold end element is coplanar to the peripheral edge portion of the respective mold end element.

3. A wound cover arrangement, as in claim 2, wherein said at least one recess has a substantially "U" shaped profile.

4. A wound cover arrangement, as in claim 3, wherein the peripheral edge portion of each mold end element has a plurality of recesses which are angularly and equally spaced from each other.

5. A wound cover arrangement, as in claim 4, wherein said plurality of recesses define a sinusoidal profile with the peripheral edge portion of the mold end element.

6. A wound cover arrangement, as in claim 4, wherein said plurality of recesses are in the form of slots having a small width and occupying at least part of the peripheral edge portion of a respective mold end element.

* * * * *